W. SPARKS.
CAM MECHANISM.
APPLICATION FILED NOV. 6, 1914.

1,241,674.

Patented Oct. 2, 1917.

William Sparks, INVENTOR

BY Howard P. Denison, ATTORNEY

UNITED STATES PATENT OFFICE.

WILLIAM SPARKS, OF JACKSON, MICHIGAN, ASSIGNOR TO THE SPARKS-WITHINGTON COMPANY, A CORPORATION OF OHIO.

CAM MECHANISM.

1,241,674.      Specification of Letters Patent.      Patented Oct. 2, 1917.

Application filed November 6, 1914. Serial No. 870,649.

*To all whom it may concern:*

Be it known that I, WILLIAM SPARKS, a citizen of the United States, and resident of Jackson, in the county of Jackson, in the State of Michigan, have invented new and useful Improvements in Cam Mechanisms, of which the following, taken in connection with the accompanying drawings, is a full, clear, and exact description.

This invention relates to certain improvements in cam mechanisms, and more particularly to a new and improved construction of cam or rotary actuator designed particularly for use in connection with signals.

The object of the invention is to produce a cam of pressed sheet metal in which the actuating teeth gradually widen and increase in altitude as they extend outwardly toward the circumference of the disk so that by lateral movement of the cam relative to a diaphragm wear-piece increased amplitude of vibration may be produced without increasing the rapidity of vibration, constituting an efficient adjustment means, and reference is hereby made to my co-pending application, Serial No. 54,737, filed October 8, 1915.

Other advantages will appear from the following description, taken in connection with the accompanying drawings, in which—

Figure 1:
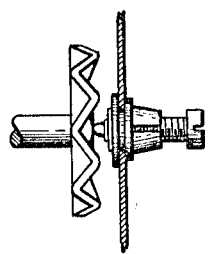
Figure 1 is a side elevation of the cam illustrating it in connection with a portion of a diaphragm embodying an adjustable wear-piece.
Figure 2:
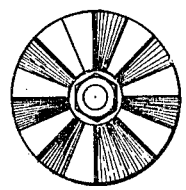
Fig. 2 is a front elevation of the cam.
Figure 3:
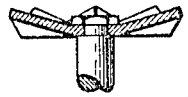
Fig. 3 is a central cross section through the cam.

In Fig. 1, I have disclosed the cam in connection with a diaphragm —1— and adjustable wear-piece formed by the projecting end of an externally threaded screw —3— having a threaded relation with an interiorly threaded sleeve —4— having a split portion —5— frictionally gripping the screw and tending to prevent rotary movement of the same. Other forms of wear-piece may be utilized.

The cam —6— is shown as mounted upon a shaft —7—, which may be the armature shaft of an electric motor, and is formed from a single disk of sheet metal, preferably circular in form, and having a central opening for the passage of the shaft. Portions of the sheet metal disk, preferably along substantially radial lines, are pressed up to form teeth —8—, which teeth increase in width and altitude as they extend outwardly from the central opening —9— and have their maximum throw at the circumference of the disk. As is shown, the teeth are pressed or offset entirely to one side of the plane of the disk.

It is obvious that various changes may be made in the details of formation and construction of the cam without departing from the spirit of this invention as set forth in the appended claims.

What I claim is:

An article of the class described formed of a substantially circular sheet metal disk and having a substantially flat central portion and radially extending teeth struck up therefrom and projecting wholly to one side of the flat central portion, thereby forming a series of radial recesses in one side of the article, and a series of radiating teeth projecting from the other side, the walls of the recesses being substantially parallel with corresponding outer walls of the teeth, said teeth gradually increasing in altitude and width as they extend toward the periphery of the disk.

In witness whereof I have hereunto set my hand this twenty-fourth day of October, 1914.

WILLIAM SPARKS.

Witnesses:
  LILLIAN WUNDERLICH,
  W. B. PATCH.

Copies of this patent may be obtained for five cents each, by addressing the "Commissioner of Patents, Washington, D. C."